United States Patent
Walter et al.

(10) Patent No.: US 7,181,897 B2
(45) Date of Patent: Feb. 27, 2007

(54) ROTARY MOWER

(75) Inventors: Rene Walter, Goetzenbruck (FR);
Horst Neuerburg, Saverne (FR);
Michel Wolff, Waltenheim sur Zorn
(FR); Jacky Kirch, Otterswiller (FR)

(73) Assignee: Kuhn S. A., Saverne Cedex (FR)

( * ) Notice: Subject to any disclaimer, the term of this patent is extended or adjusted under 35 U.S.C. 154(b) by 0 days.

(21) Appl. No.: 10/516,329

(22) PCT Filed: Jun. 3, 2003

(86) PCT No.: PCT/FR03/01660

§ 371 (c)(1),
(2), (4) Date: Dec. 14, 2004

(87) PCT Pub. No.: WO03/105566

PCT Pub. Date: Dec. 24, 2003

(65) Prior Publication Data
US 2005/0229574 A1 Oct. 20, 2005

(30) Foreign Application Priority Data
Jun. 14, 2002 (FR) .................................. 02 07606

(51) Int. Cl.
*A01D 34/52* (2006.01)
*A01D 34/73* (2006.01)

(52) U.S. Cl. ...................................................... 56/295

(58) Field of Classification Search ................ 56/13.6, 56/295, 6, 192, DIG. 17
See application file for complete search history.

(56) References Cited

U.S. PATENT DOCUMENTS

| 4,426,828 A | 1/1984 | Neuerburg |
| 4,468,916 A * | 9/1984 | Vissers et al. ............... 56/13.6 |
| 4,720,964 A * | 1/1988 | Ermacora et al. ............ 56/13.6 |
| 4,730,445 A * | 3/1988 | Wolff ......................... 56/13.6 |
| 4,761,940 A | 8/1988 | Wolff |
| 4,890,445 A | 1/1990 | Crane |
| 5,012,635 A | 5/1991 | Walters et al. |
| 5,784,866 A * | 7/1998 | Campbell et al. ................. 56/6 |
| 5,809,757 A * | 9/1998 | McLean et al. ............... 56/13.6 |

FOREIGN PATENT DOCUMENTS

| EP | 0 427 353 | 5/1991 |
| EP | 0 878 120 | 11/1998 |
| EP | 0 965 258 | 12/1999 |

OTHER PUBLICATIONS

U.S. Appl. No. 11/071,253, filed Mar. 4, 2005, Wolff.

* cited by examiner

*Primary Examiner*—Árpád Fábián Kovács
(74) *Attorney, Agent, or Firm*—Oblon, Spivak, McClelland, Maier & Neustadt, P.C.

(57) ABSTRACT

A cutting device including a gearbox of an upper part, a lower part, and a front piece, the front piece having a thickness greater than the thickness of the upper part. At least one guide bearing is connected to the gearbox by assembly elements. At least one cutting member is connected to the gearbox by the guide bearing, the cutting member being driven in rotation during work about an upwardly directed axis. And, at least one assembly element is anchored in the front piece of increased thickness, attachment of the guide bearing being thus improved.

15 Claims, 4 Drawing Sheets

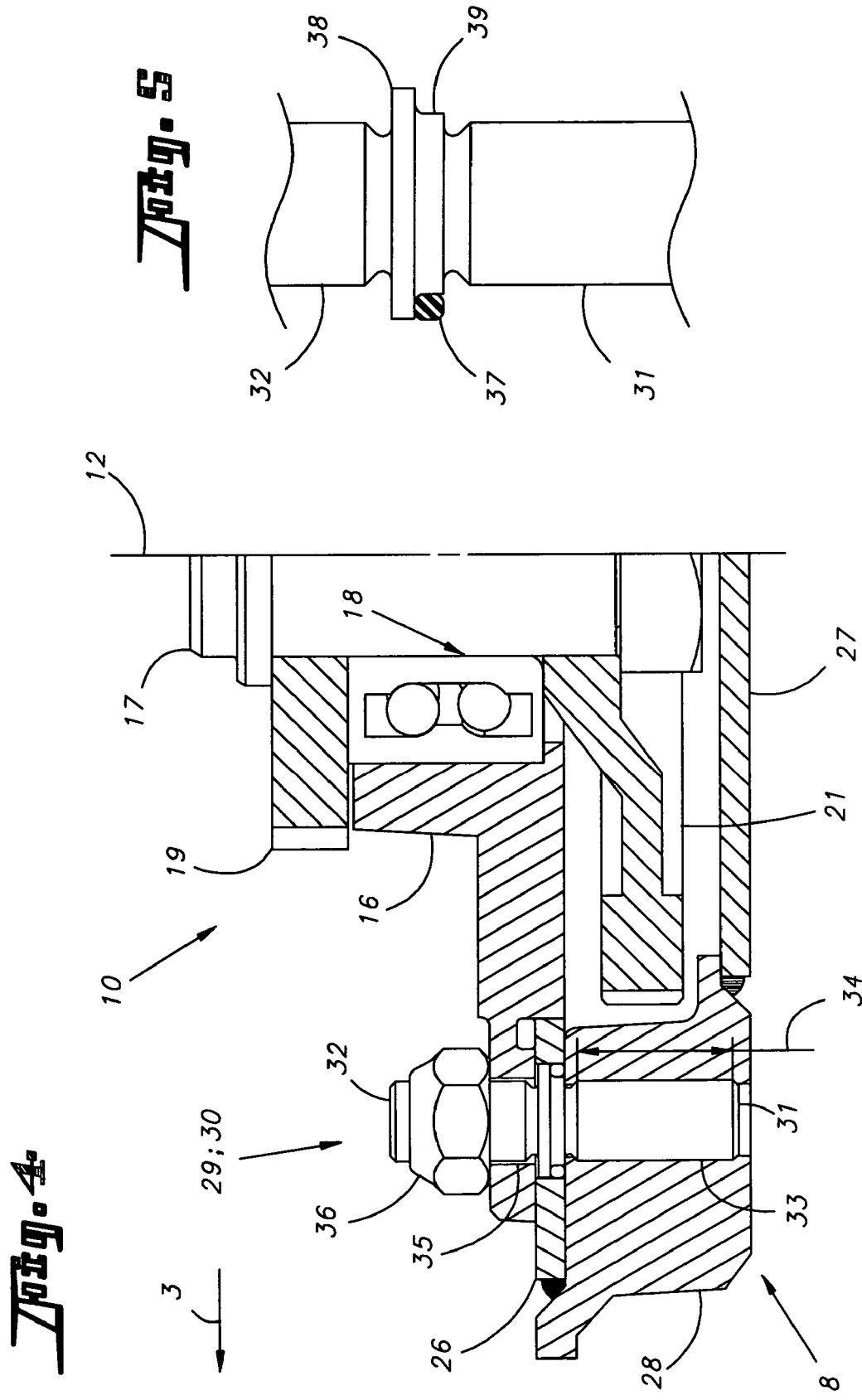

ROTARY MOWER

BACKGROUND OF THE INVENTION

FIELD OF THE INVENTION

The present invention relates to the general technical field of agricultural machinery, and in particular to the field of machines of the mower or mower-conditioner type.

More precisely, the present invention relates to a cutting device of a rotary cutting machine, said cutting device comprising:
- a gearbox consisting of an upper part, a lower part and a front piece, said front piece having a thickness greater than the thickness of said upper part,
- at least one guide bearing connected to said gearbox by means of assembly elements, and
- at least one cutting member connected to said gearbox by means of said guide bearing, said cutting member being driven in rotation during work about an upwardly directed axis.

DISCUSSION OF THE BACKGROUND

Document EP 0 965 258 A1 describes such a cutting device. This known cutting device comprises a gearbox consisting of an upper part, a lower part and a front piece. The upper part is achieved by means of a metal sheet fitted at the rear with a fold directed 90 degrees downward. The lower part is achieved by means of another relatively flat metal sheet. For its part, said front piece has the shape of a semi-cylinder whose rounded portion is directed forward. At the rear of said gearbox, the upper part and the lower part are directly connected to one another by welding. The upper part and the lower part are also connected together by welding at the front of said gearbox but via the front piece. As a general rule with the prior art cutting devices, said upper part is relatively thin, the order of magnitude being 2 to 5 mm approximately, in order not to overly increase the mass of said gearbox. In an also quite common procedure, the thickness of the metal sheet of the lower part is substantially equal to the thickness of the metal sheet of the upper part. However, said front piece constitutes a solid element whose thickness is much greater than the thickness of said upper and lower parts.

This known cutting device also comprises a cutting member connected in pivoting manner to said gearbox by means of a guide bearing. To do this, the guide bearing mainly comprises a casing furnished with bearings, said bearings guiding in rotation a drive shaft about an upwardly directed axis. The upper end of said drive shaft is rigidly connected to said cutting member. The lower end of said drive shaft extends inside said gearbox in which it is rigidly connected to a gearwheel. During work, this gearwheel is intended to drive the cutting member in rotation about said upwardly directed axis. In a manner known to those skilled in the art, this rotary motion of the cutting member allows the latter to cut a standing product, such as grass for example.

In this prior document, the casing is rigidly and removably connected to said gearbox by means of assembly elements, more precisely by threaded rods anchored in the upper part of said gearbox. These threaded rods are intended to pass through a hole provided in said casing, then to receive a nut. The tightening of the nut thus makes it possible to flatten said casing against said upper part of the gearbox.

This known cutting device nevertheless comprises a certain number of drawbacks.

Specifically, the tightening torque applied to the nut, even yet the loosening torque when there is seizing, applies a strong torsion stress to the connection between the assembly element and the gearbox. This connection between the assembly element and the gearbox also sustains a strong pulling stress from the force of tightening said nut but also from the shocks sustained by the cutting member during work. Since said assembly elements are anchored in a part of a relatively thin thickness, the combination of these two types of stress generates extremely high strains at the interface between the assembly element and the gearbox. During work, these strains risk even exceeding the admissible limits in the event of said cutting member encountering an obstacle. The risks of breaking this connection are therefore considerable.

In addition, the rigidity of the connection between the casing and the gearbox is relatively weak due to the reduced thickness of the part of said gearbox supporting said casing. The forces sustained by the cutting member during work therefore risk causing an excessive change in the orientation of the drive shaft. Since the cutting member is operating immediately adjacent to the gearbox, a change in the orientation of the drive shaft may, in some circumstances, cause an interference between said cutting member and said gearbox. Such a deviation of the drive shaft also causes deterioration in the alignment of the gearwheel, hence a reduction in the quality of its engagement. Finally, this lack of rigidity may even be the origin of a fatigue breakage of said upper part of the gearbox.

SUMMARY OF THE INVENTION

The present invention advantageously proposes to improve the attachment of said guide bearing on said gearbox in order to reduce or even remove the drawbacks of the prior art.

Accordingly, the cutting device of the present invention is characterized in that at least one assembly element intended to connect said guide bearing to said gearbox is anchored in said front piece of increased thickness.

Thus the interface between the assembly element and the gearbox is advantageously increased. The various forces sustained by the assembly element therefore generate much lighter strains at this interface. The risks of tearing out the assembly element are consequently greatly reduced.

In addition, the shocks sustained by the cutting member during work are now transmitted to the piece of increased thickness. There is therefore a better distribution of the strains and a greater rigidity in the connection between the casing and the gearbox. The various risks associated with an excessive movement of the drive shaft are therefore equally greatly reduced.

BRIEF DESCRIPTION OF THE DRAWINGS

Other features of the invention, to be considered separately or in all their possible combinations, will also appear in the following description of a nonlimiting exemplary embodiment of the invention depicted in the appended drawings in which:

FIG. 4 represents, as seen in partial section along the arrow 4 and on another scale, the cutting device of FIG. 2, FIG. 5 represents an enlargement of a central part of the assembly element of FIG. 4.

DETAILED DESCRIPTION OF THE INVENTION

Figure 1:
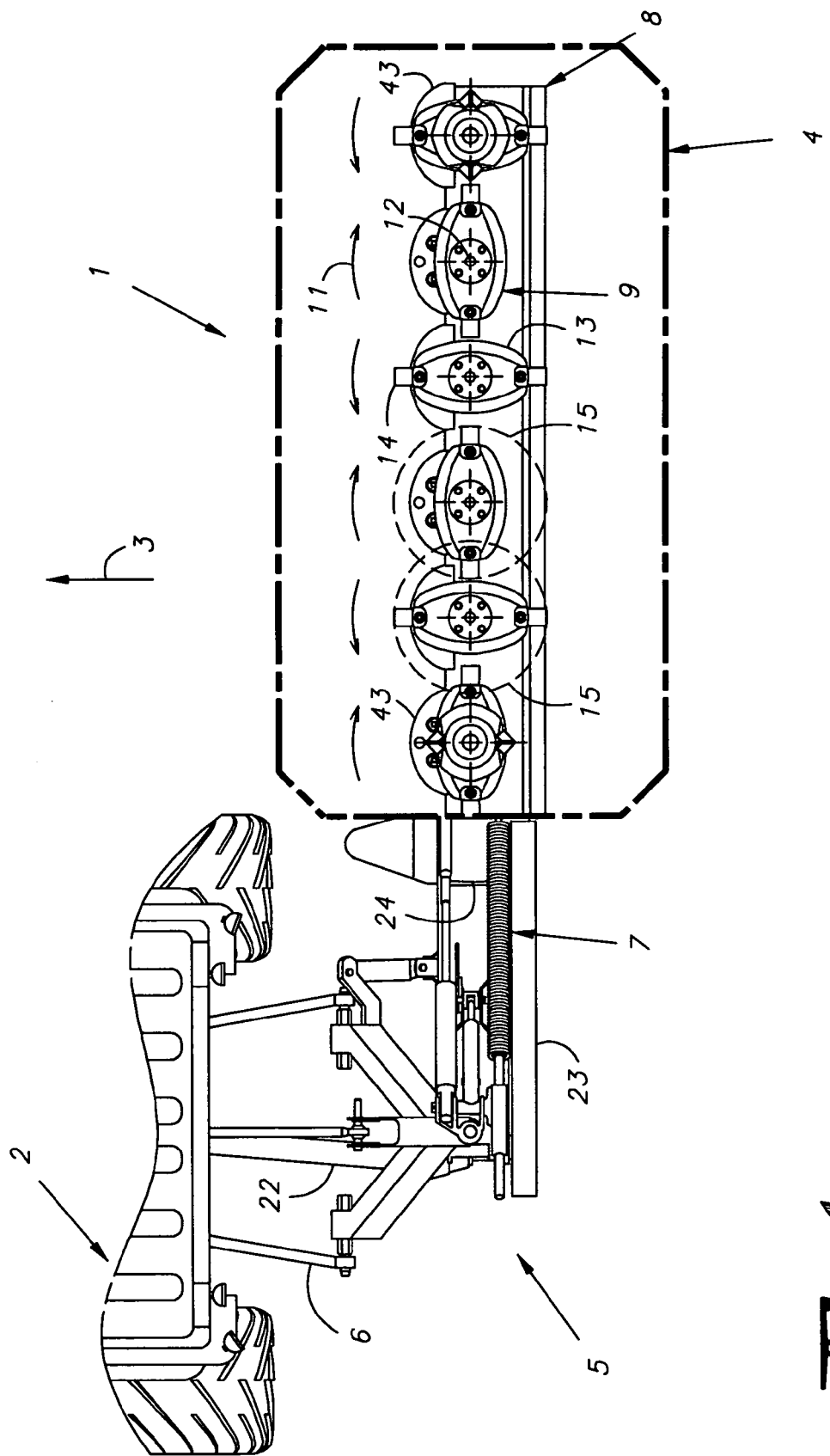
FIG. 1 represents, as seen from above, an agricultural machine according to the invention.

FIG. 1 represents, seen from above, an agricultural mower (1) according to the present invention. Said mower (1) is hitched to a driving vehicle (2) which pulls it in a line and a direction of travel indicated by the arrow (3). In the rest of the description, the following concepts "front" and "rear", "in front of" and "behind" are defined in relation to the direction of travel (3) and the concepts "right" and "left" are defined when looking at said mower (1) from the rear in the direction of travel (3).

In a manner known by those skilled in the art, said mower (1) comprises a cutting device (4) intended to cut a standing product such as grass for example. Said mower (1) also comprises a frame (5) making it possible to connect said cutting device (4) to said driving vehicle (2).

In the exemplary embodiment shown in FIG. 1, said agricultural mower (1) is of the rear mounted type. Thus one end of said frame (5) is intended to be hitched to a three-point hitch (6) placed at the rear of said driving vehicle (2). However, the other end of said frame (5) is attached to said cutting device (4) by means of an articulation. Said frame (5) advantageously makes it possible to move said cutting device (4) from a substantially horizontal working position, as shown in FIG. 1, to a transport position (not shown) and vice versa. Preferably, said frame (5) comprises a suspension device (7) intended during work to transfer at least part of the weight of said cutting device (4) to said driving vehicle (2). Advantageously, said suspension device (7) also allows said cutting device (4) to follow the irregularities of the ground independently of the position of said driving vehicle (2). Such a frame (5) of a mower (1) is well known to those skilled in the art, so it will not be described further.

The cutting device (4) according to the present invention comprises a gearbox (8), at least one cutting member (9), and at least one guide bearing (10) intended to connect in pivoting manner said cutting member (9) to said gearbox (8). During work, said gearbox (8) rests at least partially on the ground, transverse to said direction of travel (3). In a manner known to those skilled in the art, said gearbox (8) rests on the ground advantageously by means of skids (43) shown in FIG. 1. Said cutting member (9) for its part is placed above said gearbox (8). In addition, said cutting member (9) is driven in a direction of rotation (11) about an upwardly directed axis (12). In the exemplary embodiment shown in the figures, said cutting device (4) more precisely comprises six cutting members (9) connected to said gearbox (8) by means of a respective guide bearing (10). Each cutting member (9) is driven in rotation about a respective axis (12) and in a respective direction (11). Preferably, said cutting members (9) are aligned on a straight line and arranged in one and the same extension plane.

In a manner known to those skilled in the art, this rotary motion of said cutting member (9), at a high speed of approximately 3000 revolutions per minute, allows the latter to cut said standing product.

Figure 3:
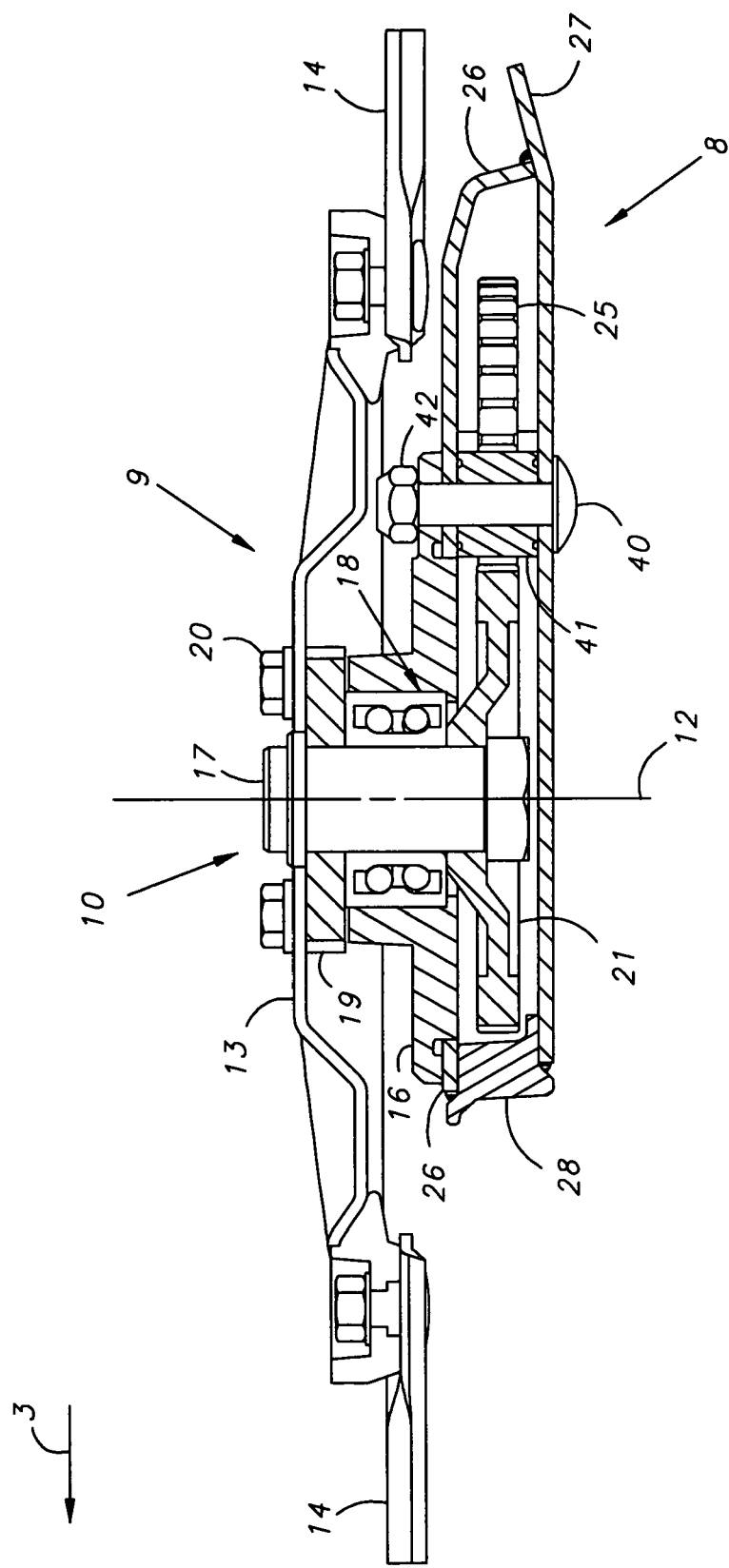
FIG. 3 represents, as seen in section along the arrow 3 and on an another scale, the cutting device of FIG. 2.

Specifically, in the exemplary embodiment depicted more precisely in FIGS. 1 and 3, said cutting member (9) advantageously comprises a support (13) and two cutting elements (14). Said support (13) extends in a plane substantially perpendicular to said axis of rotation (12). Said cutting elements (14) are connected to the periphery of said support (13), on either side of said axis of rotation (12). Preferably, said support (13) has an oval shape and said cutting elements (14) are advantageously arranged at the ends of a large diameter of said oval shape. Since said cutting member (9) is driven in rotation during work, said cutting elements (14) therefore describe circles (15) about said axis of rotation (12). The great speed of movement thus achieved by said cutting elements (14) allows the latter to cut said standing product by impact.

To connect said cutting member (9) pivotingly to said gearbox (8), said guide bearing (10) comprises a casing (16) and a shaft (17). Said shaft (17) is guided in rotation about said axis (12) by any means known to those skilled in the art. Thus, as shown in FIG. 3, the connection between said shaft (17) and said casing (16) is advantageously achieved by a bearing (18). Preferably, the longitudinal axis of said shaft (17) merges with said upwardly directed axis (12). The upper end of said shaft (17) is furnished with a driving element (19) intended to be rigidly connected to said cutting member (9). In the exemplary embodiment depicted in the figures, said driving element (19) is more precisely connected to said support (13). With preference, the connection between said driving element (19) and said support (13) is achieved according to a removable manner, for example by means of screws (20) visible in FIG. 3. Said cutting member (9) may thus be easily replaced if necessary.

In the exemplary embodiment depicted in the figures and advantageously, said guide bearing (10) also makes it possible to drive said cutting member (9) in rotation about said axis (12) during work. To do this, the lower end of said shaft (17) is intended to be connected to a transmission member (21). The implementation of this drive will be described later in greater detail.

For its part, said casing (16) is rigidly connected to said gearbox (8). In a particularly advantageous manner, the connection between said casing (16) and said gearbox (8) is achieved according to a removable manner by means of assembly elements (29). The whole of said guide bearing (10), which consists of the casing (16), the shaft (17), the driving element (19) and the transmission member (21), may thus be easily replaced if necessary.

According to the present invention, said gearbox (8) consists of an upper part (26), a lower part (27) and a front piece (28). The thickness of said front piece (28) is greater than the thickness of said upper part (26).

In the exemplary embodiment depicted more precisely in FIGS. 3 and 4, said upper part (26) is made of a metal sheet which advantageously extends along the whole length of the cutting device (4). For its part, said lower part (27) is made of another metal sheet, which equally extends along the whole length of the cutting device (4). Generally, the thickness of said upper part (26) and the thickness of said lower part (27) are each less than 10 millimeters. Preferably, each of said thicknesses lies between 2 and 5 millimeters so that the mass of said gearbox is not excessive. In the exemplary embodiment depicted in FIGS. 3 and 4, said upper part (26) and said lower part (27) have the same thickness.

The section of said front piece (28) is much greater, however. Thus, in the light of the sectional drawings of FIGS. 3 and 4, the height and width of said section are, as an indication, both greater than 10 millimeters. Said front piece (28) is a solid piece advantageously obtained with the aid for example of a casting process or a forging process. The section, preferably the width, of said front piece (28)

may therefore vary along said gearbox (8) in such a manner as to be greater at the most stressed locations. The great inertia of said front piece (28) contributes considerably to the rigidity of said gearbox (8). Preferably, said front piece (28) is also intended to support said skids (43) by means of which said gearbox (8) rests at least partially on the ground during work. The shocks sustained by said skids (43) during work are thus advantageously transmitted to the solid piece of said gearbox (8) and therefore better to absorb.

In the exemplary embodiment depicted in the figures, said upper part (26) and said lower part (27) are joined together at the front of said gearbox (8) by means of said front piece (28). However, at the rear of said gearbox (8), said upper part (26) directly joins said lower part (27). To do this, said upper part (26) is folded downward at the rear. The connection between the various elements forming said gearbox (8), that is to say said upper part (26), said lower part (27) and said front piece (28), is advantageously achieved by welding.

Figure 2:
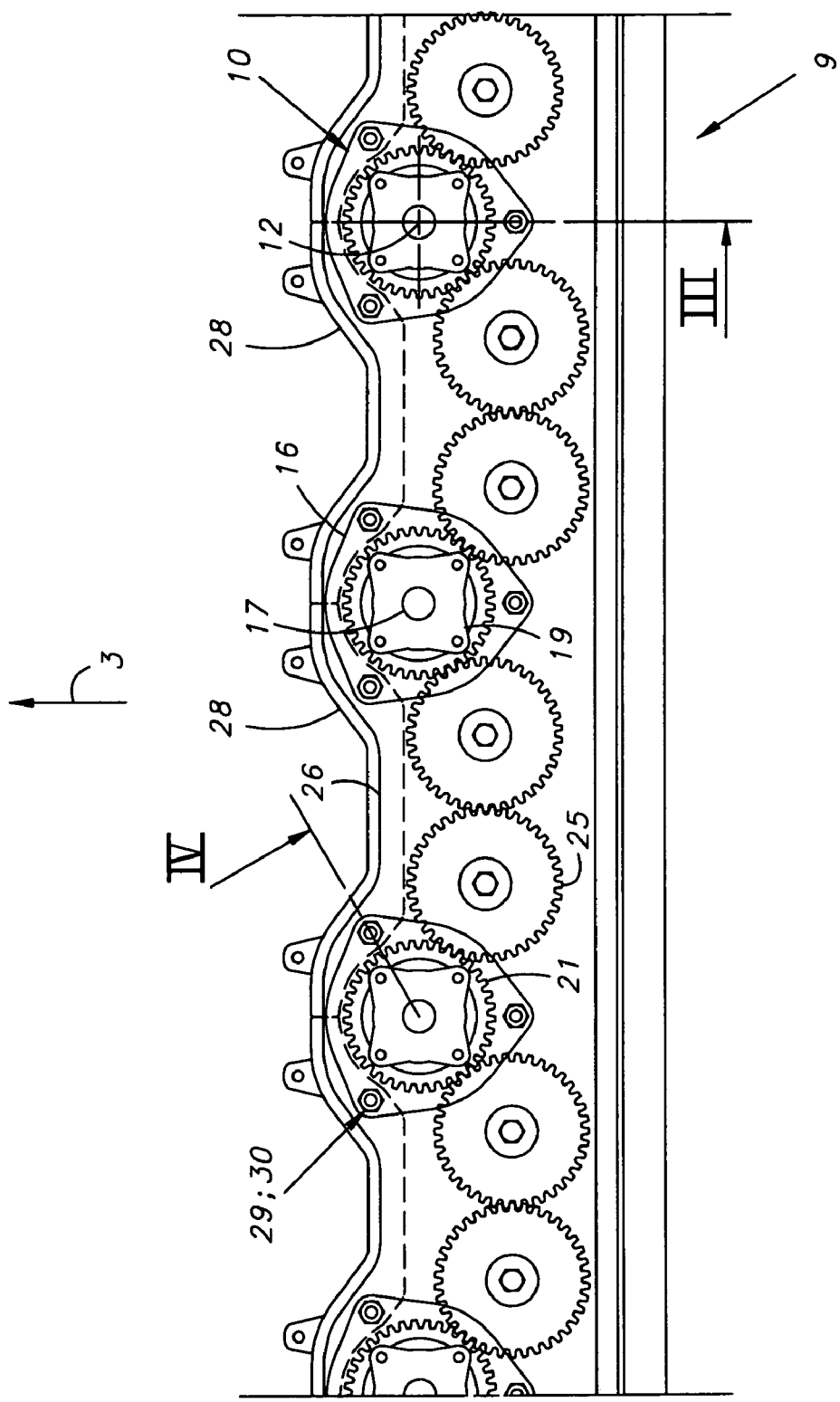
FIG. 2 represents, as seen from above, a part of the cutting device of the agricultural machine of FIG. 1.

Preferably and as seen more particularly in FIG. 2, the length of said gearbox (8) consists of several front pieces (28) placed contiguously. Each front piece (28) taken individually extends substantially over the distance separating two consecutive cutting members (9). Said front pieces (28) being relatively small, the manufacturing of the latter particularly by casting or by forging is therefore easier.

It will be noted that for reasons of clarity, many elements have not been depicted in FIG. 2, in particular said skids (43) and said cutting members (9).

As shown in FIG. 1, said cutting members (9) are driven from the power-take-off of said driving vehicle (2). To do this, said mower (1) comprises in particular a telescopic transmission shaft with universal joints (22), a pulley-belt system (23) and an angled transmission gearbox (24). As seen in FIG. 2, the rotary motion is then distributed to the various cutting members (9) with the aid of intermediate gears (25). The transmission member (21) of said guide bearings (10) is thus in this example achieved by means of a gearwheel. It will be noted that in FIG. 2, said intermediate gears (25) and said gearwheels (21) have been shown in cutaway.

Additionally with reference to FIG. 3, said intermediate gears (25) and said gearwheels (21) engage with one another inside said gearbox (8). These transmission elements being splash-lubricated, said gearbox (8) is therefore preferably sealed. In the exemplary embodiment depicted, the sealing between the various elements constituting said gearbox (8) is obtained by said welding. The lateral ends of said gearbox (8) are closed off by means of plates which are also connected in sealed manner by means of a weld for example.

Said upper part (26) advantageously comprises an opening allowing the at least partial insertion of said guide bearing (10), particularly of said gearwheel (21), inside said gearbox (8). This opening also makes it possible to center said casing (16) with respect to said adjacent intermediate gears (25). The sealing between said gearbox (8) and said casing (16) is achieved by any means known to those skilled in the art, such as an O-ring for example.

Other manners of producing said gearbox (8) are possible without nevertheless departing from the present invention.

Thus, according to an exemplary embodiment not depicted, said upper part (26) and said lower part (27) are joined at the rear of said gearbox (8) via an intermediate piece.

According to another exemplary embodiment not depicted, said upper part (26) and said lower part (27) are made from one and the same metal sheet. At the rear of said gearbox (8), this metal sheet is folded at 180 degrees so as to delineate the shape of a "U" the opening of which is oriented toward the front of said gearbox (8).

According to yet another exemplary embodiment not depicted, said upper part (26) and said lower part (27) are joined directly at the front of said gearbox (28). In such a case, said front piece (28) may not contribute to closing off the cavity formed by said gearbox (8). On the contrary, said front piece (28) remains connected by welding to said upper part (26) and/or to said lower part (27).

The cutting device (4) of the present invention is remarkable due to the fact that at least one of said assembly elements (29) intended to connect said guide bearing (10) to said gearbox (8) is anchored in said front piece (28) of increased thickness. That is to say that the traction and/or torsion forces sustained by said assembly element (29) are transmitted to said front piece (28).

In the exemplary embodiment depicted more particularly in FIG. 4, said assembly element (29) anchored in said front piece (28) is produced by means of a pin (30). In a manner known to those skilled in the art, said pin (30) comprises a first threaded part (31) and a second threaded part (32). Said first threaded part (31) is intended to be screwed into a tapping (33) made in said front piece (28). For its part, said second threaded part (32) is intended to pass through a hole (35) made in said casing (16) then to receive a nut (36). By tightening said nut (36), said casing (16) is flattened against said gearbox (8) in order to produce a rigid connection. Since said front piece (28) has a greater thickness, the length of insertion (34) of said first threaded part (31) is relatively great. As a result, the connection between said pin (30) and said gearbox (8) may transmit a greater force and torque without risk of breakage. Said casing (16) and hence said guide bearing (10) are connected more firmly to said gearbox (8). Furthermore with the present invention, the shocks sustained by said cutting member (9) are absorbed by said front piece (28) via said guide bearing (10) and said pin (30). Since said front piece (28) is a solid piece and therefore of greater rigidity, the peaks of force due to the shocks are better distributed in said gearbox (8). Besides, thanks to this greater rigidity of the connection between said casing (16) and said gearbox (8), said axis of rotation (12) moves distinctly less during the shocks. In the light of FIG. 3, the risk of interference between said cutting member (9) and for example the rear of the upper part (26) of said gearbox (8) are therefore greatly diminished. In addition, a lesser movement of said axis of rotation (12) following the shocks generates a lesser misalignment of said corresponding gearwheel (21). The possible increase in the stresses at the engagement between said gearwheel (21) and the adjacent intermediate gear (25) is consequently attenuated.

In the exemplary embodiment shown in the figures, said upper part (26) partially covers the top of said front piece (28). Thus said upper part (26) additionally comprises a hole to allow said pin (30) to reach said front piece (28). Nevertheless to ensure the tightness of said gearbox (8), said pin (30) advantageously supports an O-ring (37). As a result, in the light of FIG. 5, said pin (30) comprises a collar (38) arranged between said first threaded part (31) and said second threaded part (32). Between said collar (38) and said first threaded part (31), said pin (30) also comprises a shoulder (39). With reference to FIG. 4, when said pin (30) is installed, said first threaded part (31) is screwed into said tapping (33) until contact is obtained between said shoulder (39) and said front piece (28). To this end, the diameter of said collar (38) is advantageously less than the diameter of the hole made in said upper part (26). Said O-ring (37) is thus slightly flattened between said collar (38) and said front piece (28). The lubricant present in said gearbox (8) may therefore not escape along said tapping (33). Said O-ring (37) is also slightly flattened between said shoulder (39) and said upper part (26). Any outflow of lubricant between said upper part (26) and said pin (30) is therefore also prevented. During dismounting, said nut (36) is loosened and then released from said second threaded part (32). Said first threaded part (31) advantageously remains anchored in said front piece (28). Any risk of loss of said O-ring (37) is therefore removed.

It will also be noted that for reasons of clarity, said O-ring (37) has been shown only partially in FIG. 5. In addition, said O-ring (37) has been shown in its slightly flattened form.

In the exemplary embodiment shown more precisely in FIG. 2, each guide bearing (10) is connected to said gearbox (8) by means of two pins (30). Said pins (30) are placed at the front and on either side of said corresponding axis of rotation (12). The securing of said guide bearings (10) is therefore further improved. In addition, each guide bearing (10) also comprises a third assembly element (29) placed behind and in the extension of said corresponding axis of rotation (12). Now in the light of FIG. 3, said third assembly element (29) is achieved by means of a screw (40). In sequence, said screw (40) passes through said lower part (27), a spacer (41), said upper part (26), said casing (16) and a nut (42). Also provided is a seal on the one hand between said spacer (41) and said upper part (26), and on the other hand between said spacer (41) and said lower part (27). These seals are achieved by means of O-rings.

Other methods of achieving said assembly element (29) anchored in said front piece (28) are possible without, nevertheless, departing from the present invention.

Thus, according to an exemplary embodiment not shown, said assembly element (29) anchored in said front piece (28) is achieved by means of a screw whose thread is engaged in said front piece (28).

In another exemplary embodiment, this screw passes from bottom to top through said front piece (28). The head of this screw is advantageously engaged in a matching shape provided in said front piece (28) in order to prevent said screw from rotating. The thread of the screw passes through a hole made in said casing (16) to receive a nut (36).

According to another exemplary embodiment not shown, said assembly element (29) anchored in said front piece (28) is achieved by means of a threaded rod rigidly attached in said front piece (28) by means of a weld for example. This threaded rod also passes through said casing (16) to receive a nut (36).

In yet another exemplary embodiment, said upper part (26) does not cover the top of said front piece (28). Thus, at least in the zone of said assembly element (29), said casing (16) rests directly on said front piece (28).

The mower (1) and the cutting device (4) which have just been described are only one example which in no circumstances may limit the field of protection defined by the following claims.

Specifically, the number and shape of said cutting members (9) may be different from those shown in the figures.

The transmission of the rotary motion to said cutting members (9) may also be achieved by any other means known to those skilled in the art, such as a chain for example.

In addition, the cutting device (4) according to the present invention may very well be fitted to a mower of the trailed type or a self-propelled mower.

The invention claimed is:

1. A cutting device of a rotary cutting machine, said cutting device comprising:
   a gearbox having an upper part, a lower part, and a front piece, said front piece having a thickness greater than a thickness of said upper part,
   at least one guide bearing connected to said gearbox by assembly elements and within which a shaft is supported, said guide bearing including a bearing casing to which said upper part is connected, said bearing casing having a greater thickness than said upper part; and
   at least one cutting member connected to said gearbox by said guide bearing and driven by said shaft, said cutting member being driven in rotation by said shaft during work about an upwardly directed axis; and
   wherein at least one of said assembly elements configured to connect said guide bearing connected to said gearbox is anchored in said front piece of increased thickness.

2. A cutting device as claimed in claim 1, wherein said upper part and said lower part have substantially a same thickness.

3. A cutting device as claimed in claim 1, wherein said upper part and said lower part are joined together at the front of said gearbox by said front piece.

4. A cutting device as claimed in claim 1, wherein said upper part and said lower part are joined together directly at a rear of said gearbox.

5. A cutting device as claimed in claim 2, wherein said upper part and said lower part are made of a same metal sheet.

6. A cutting device as claimed in claim 3, wherein said upper part, said lower part, and said front piece are connected together by welding to create a sealed gearbox.

7. A cutting device as claimed in claim 1, wherein said gearbox encloses transmission elements configured to drive said cutting member in rotation about said axis.

8. A cutting device as claimed in claim 1, wherein said guide bearing is removably connected to said gearbox.

9. A cutting device as claimed in claim 8, wherein said guide bearing is arranged above said gearbox.

10. A cutting device as claimed in claim 1, wherein said assembly element anchored in said front piece comprises a pin comprising a first threaded part and a second threaded part.

11. A cutting device as claimed in claim 10, wherein said first threaded part is configured to be screwed into a tapping made in said front piece.

12. A cutting device as claimed in claim 11, wherein said first threaded part passes through a hole made in said upper part of said gearbox.

13. A cutting device as claimed in claim 10, wherein said pin comprises a collar arranged between said first threaded part and said second threaded part, and said pin additionally comprises a shoulder arranged between said collar and said first threaded part.

14. A cutting device as claimed in claim 13, further comprising an O-ring, said O-ring being slightly flattened during mounting between said collar, said front piece, said shoulder, and said upper part.

15. An agricultural mower, which comprises a cutting device as claimed in claim 1.

* * * * *